US012230091B2

(12) United States Patent
Park et al.

(10) Patent No.: US 12,230,091 B2
(45) Date of Patent: Feb. 18, 2025

(54) BILL PROCESSING DEVICE

(71) Applicant: HYOSUNG TNS INC., Seoul (KR)

(72) Inventors: Chang Ho Park, Gyeonggi-do (KR); Hyun Soo Jang, Gyeonggi-do (KR); Jong Seong Park, Gyeonggi-do (KR); Suk Joo Kim, Gyeonggi-do (KR)

(73) Assignee: HYOSUNG TNS INC., Seoul (KR)

( * ) Notice: Subject to any disclaimer, the term of this patent is extended or adjusted under 35 U.S.C. 154(b) by 638 days.

(21) Appl. No.: 17/427,249

(22) PCT Filed: Nov. 22, 2019

(86) PCT No.: PCT/KR2019/016149
§ 371 (c)(1),
(2) Date: Jul. 30, 2021

(87) PCT Pub. No.: WO2020/218697
PCT Pub. Date: Oct. 29, 2020

(65) Prior Publication Data
US 2022/0122404 A1 Apr. 21, 2022

(30) Foreign Application Priority Data
Apr. 24, 2019 (KR) ........................ 10-2019-0047707

(51) Int. Cl.
*G07D 11/23* (2019.01)
*G07D 11/245* (2019.01)
(Continued)

(52) U.S. Cl.
CPC ........... *G07D 11/23* (2019.01); *G07D 11/245* (2019.01); *G07D 11/60* (2019.01); *G07F 19/207* (2013.01)

(58) Field of Classification Search
CPC ...... G07D 11/245; G07D 11/23; G07D 11/60; G07D 11/34; G07F 19/207; B65H 31/22; B65H 43/04
See application file for complete search history.

(56) References Cited

U.S. PATENT DOCUMENTS 9,911,265 B2 * 3/2018 Lee ........................ G07D 11/50
10,269,201 B2 * 4/2019 Kim ........................ B65H 1/28
(Continued)

FOREIGN PATENT DOCUMENTS

JP 2005049919 A 2/2005
JP 2012238165 A * 12/2012
(Continued)

*Primary Examiner* — Patrick H Mackey
(74) *Attorney, Agent, or Firm* — BACON&THOMAS, PLLC

(57) ABSTRACT

The purpose of the present disclosure is to provide a banknote processing device that may separate and process normal banknotes and rejected banknotes during replenishment/collection and easily confirm the number of replenished or collected normal banknotes. The present invention for implementing this includes: a determination unit that determines whether or not a replenished or collected banknote is normal; a temporary storage unit in which the banknote determined as a normal banknote by the determination unit is temporarily stored; a counterfeit banknote cassette in which a replenished rejected banknote and a collected rejected banknote rejected by the determination unit are stored; a banknote storage unit in which a replenished banknote or a banknote to be collected, which is determined as a normal banknote by the determination unit, is stored; a replenishment/collection cassette in which a banknote to be replenished in the banknote storage unit or a normal banknote collected from the banknote storage unit is stored; and a transport path through which the banknote is transported.

8 Claims, 7 Drawing Sheets

(51) Int. Cl.
*G07D 11/60* (2019.01)
*G07F 19/00* (2006.01)

(56) References Cited

U.S. PATENT DOCUMENTS

| | | | | |
|---|---|---|---|---|
| 2014/0332340 | A1* | 11/2014 | Adachi | G07D 11/50<br>194/206 |
| 2018/0300990 | A1* | 10/2018 | Kim | G07D 11/20 |

FOREIGN PATENT DOCUMENTS

| | | | | | |
|---|---|---|---|---|---|
| KR | 20110104645 | A | | 9/2011 | |
| KR | 20150059186 | A | * | 6/2015 | |
| KR | 101534412 | B1 | | 7/2015 | |
| WO | WO-2017065471 | A1 | * | 4/2017 | B65H 1/025 |

* cited by examiner

[FIG.1]
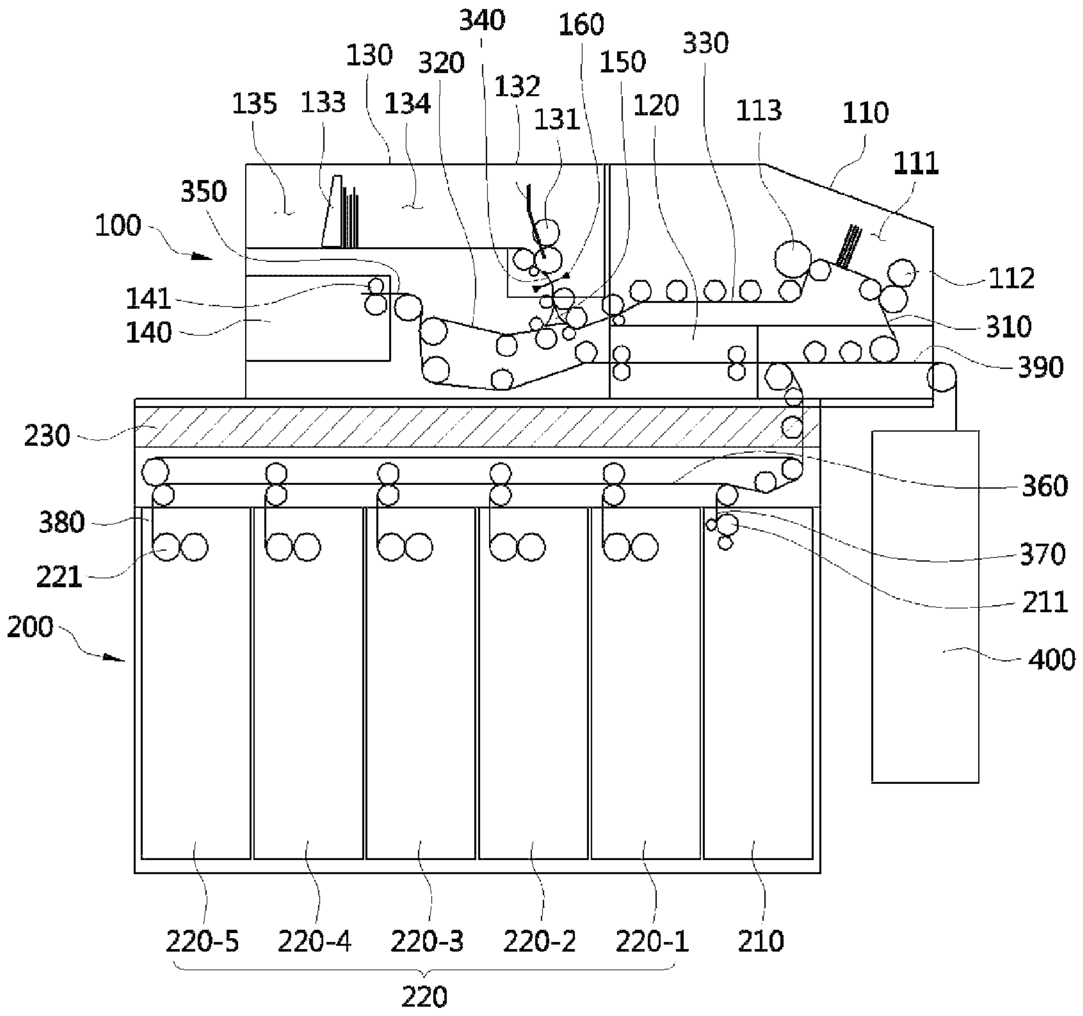

[FIG.2]
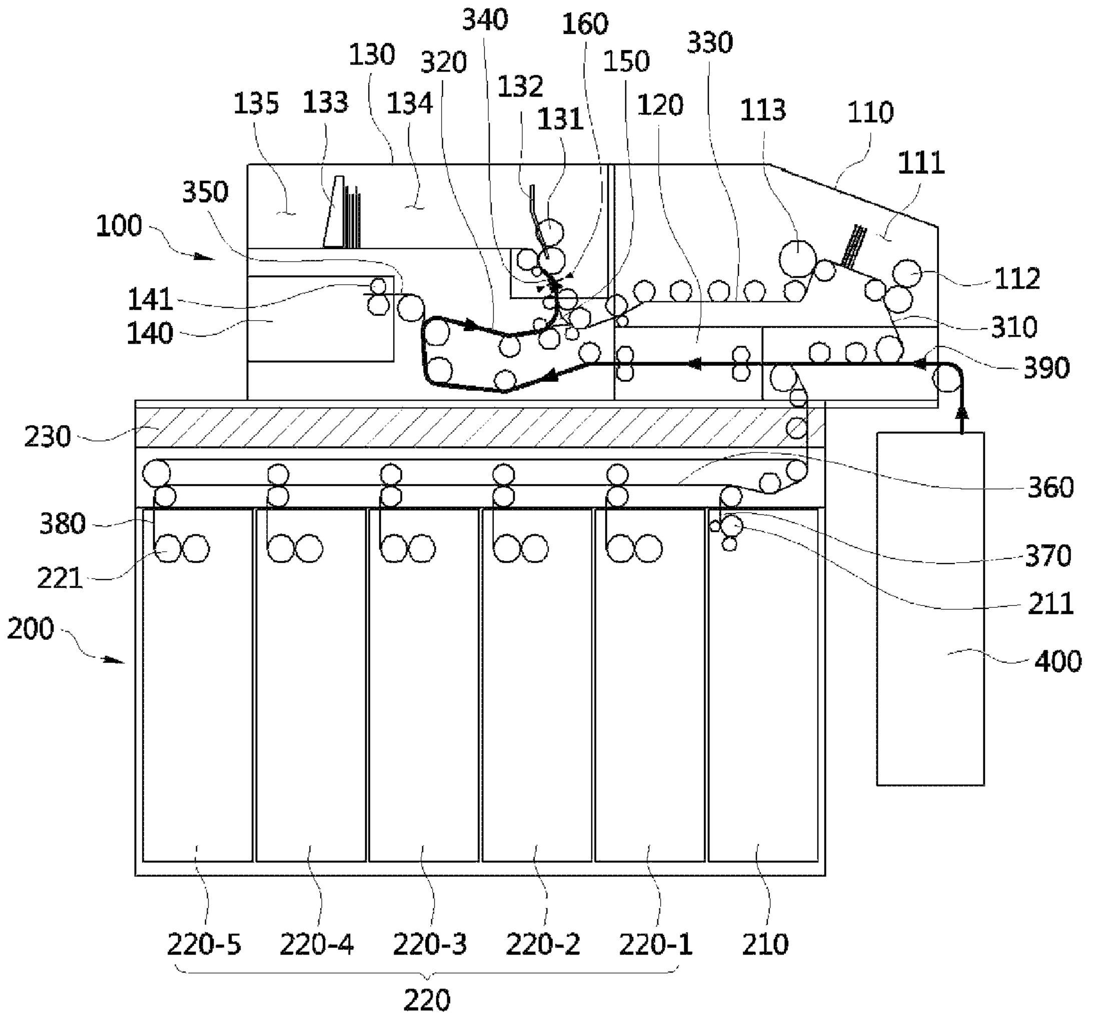

[FIG.3]
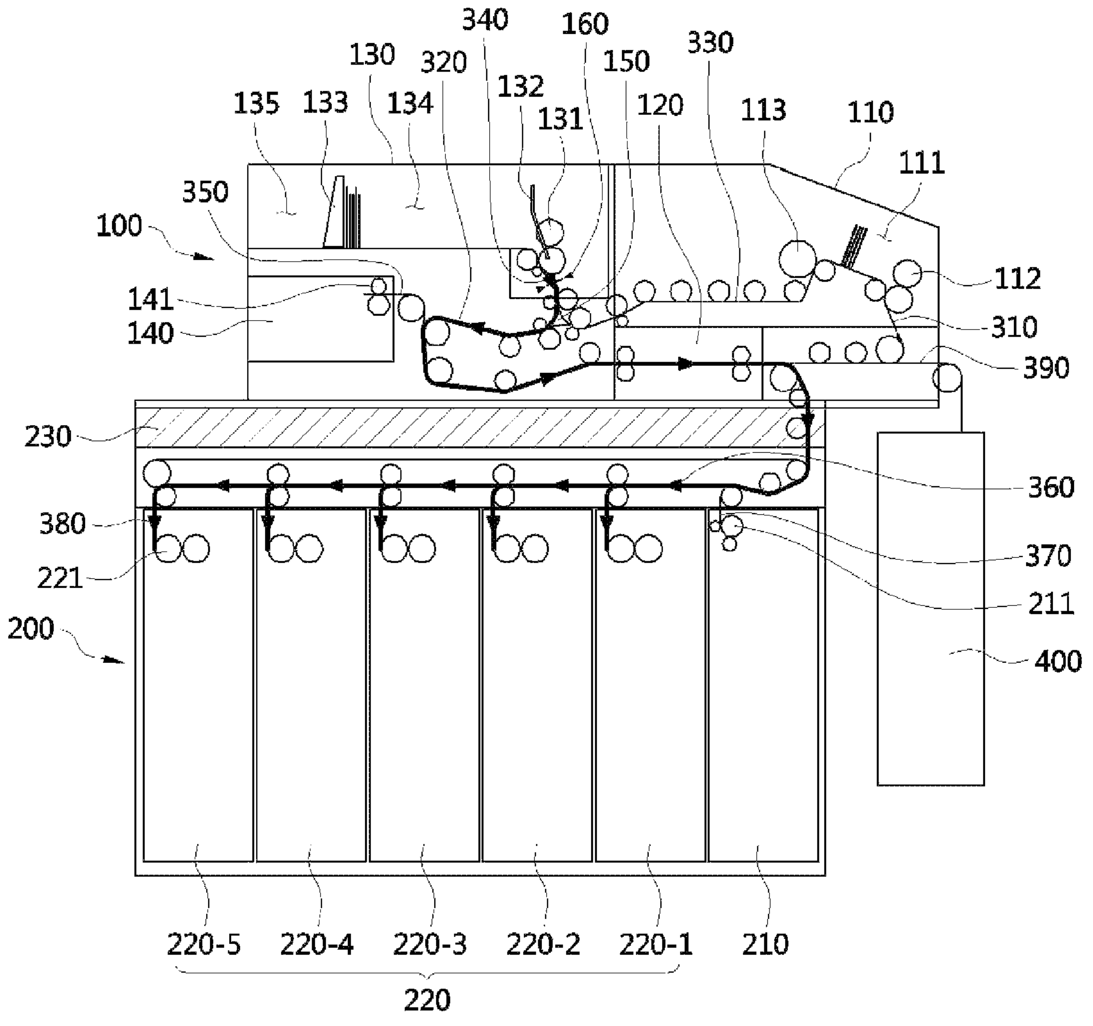

[FIG.4]
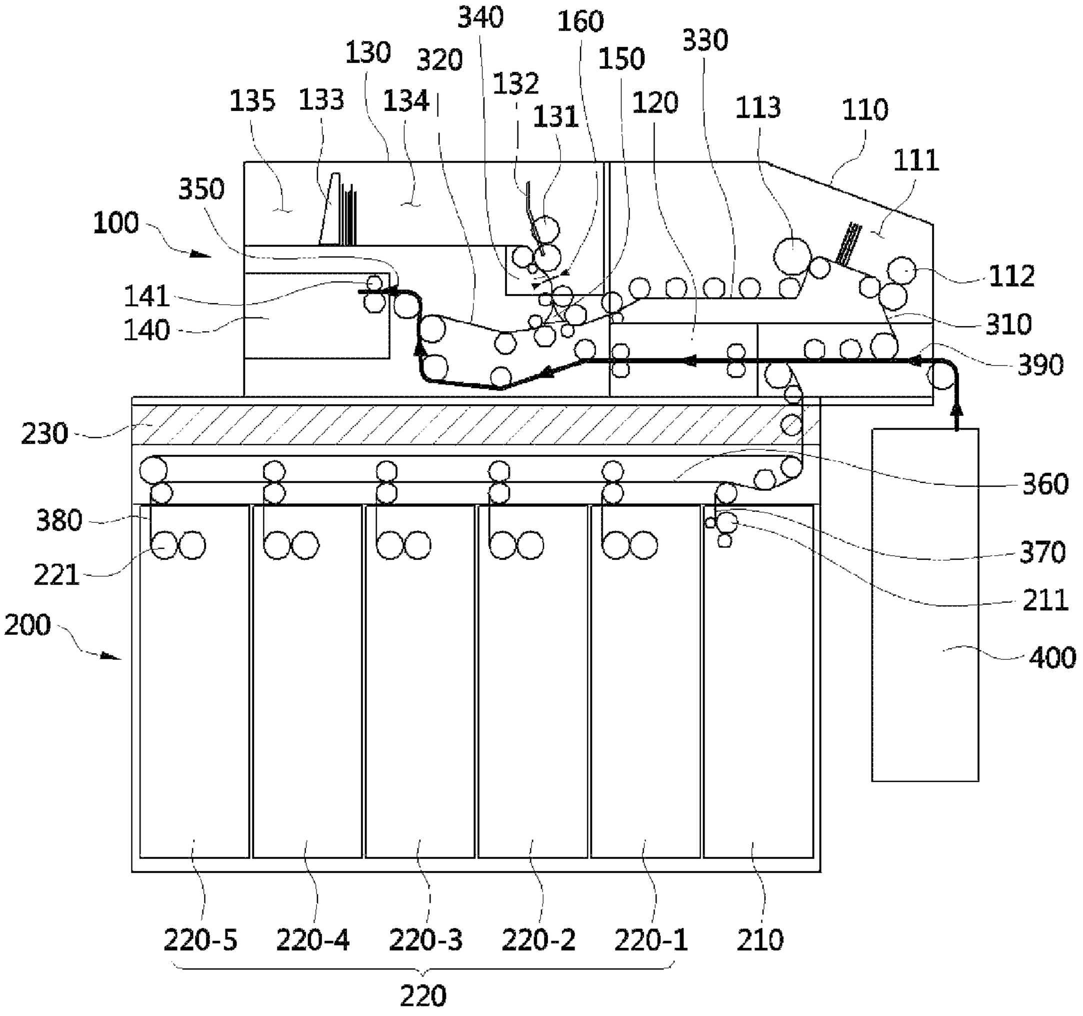

[FIG.5]
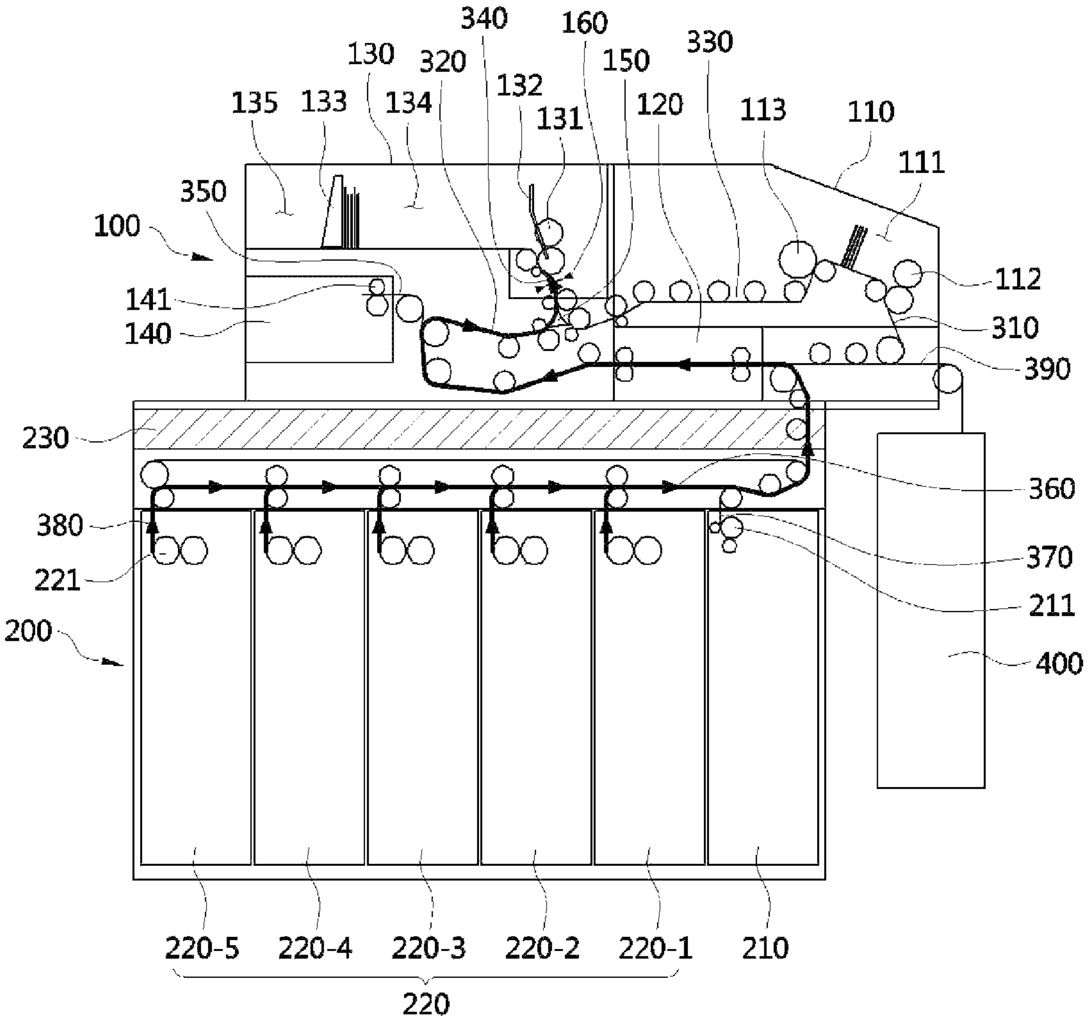

[FIG.6]
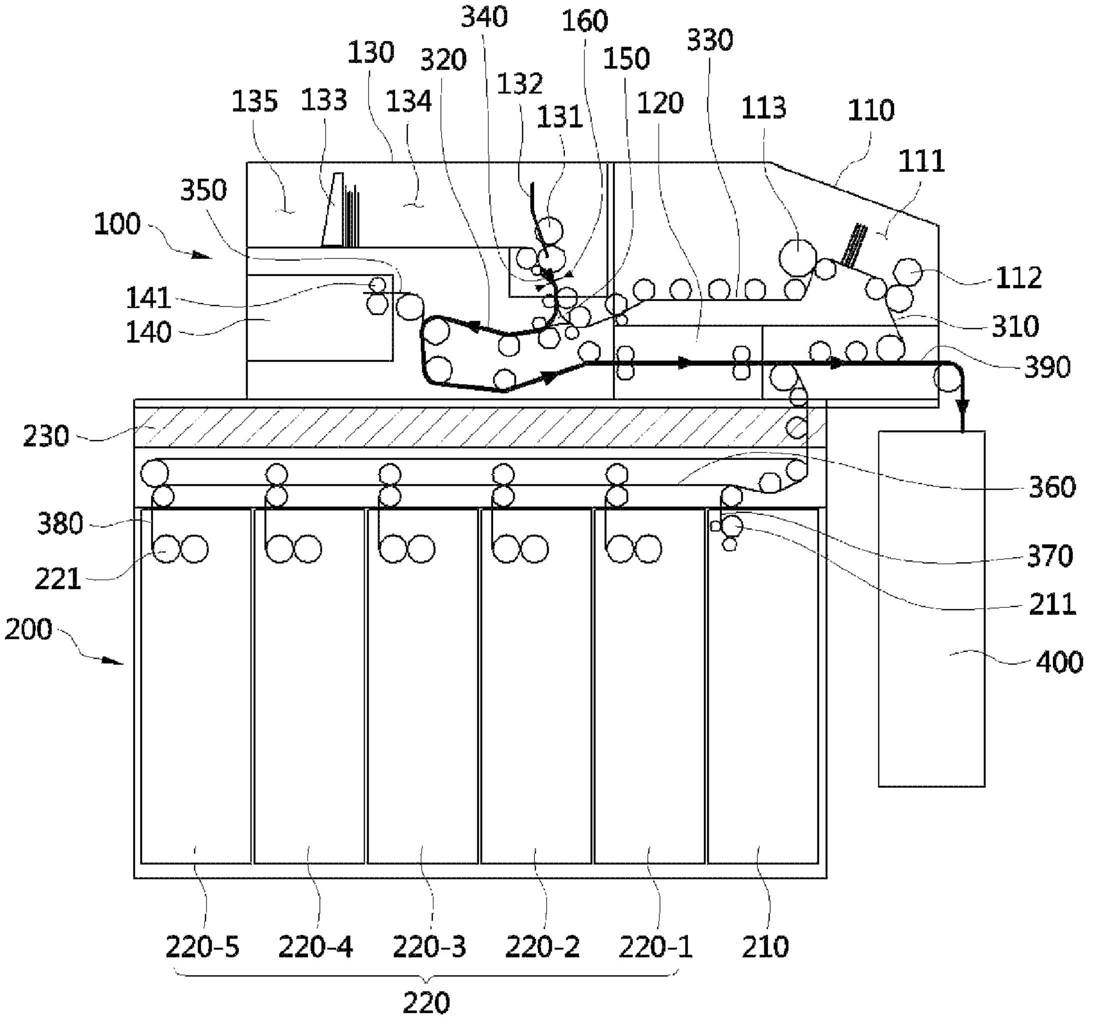

[FIG.7]
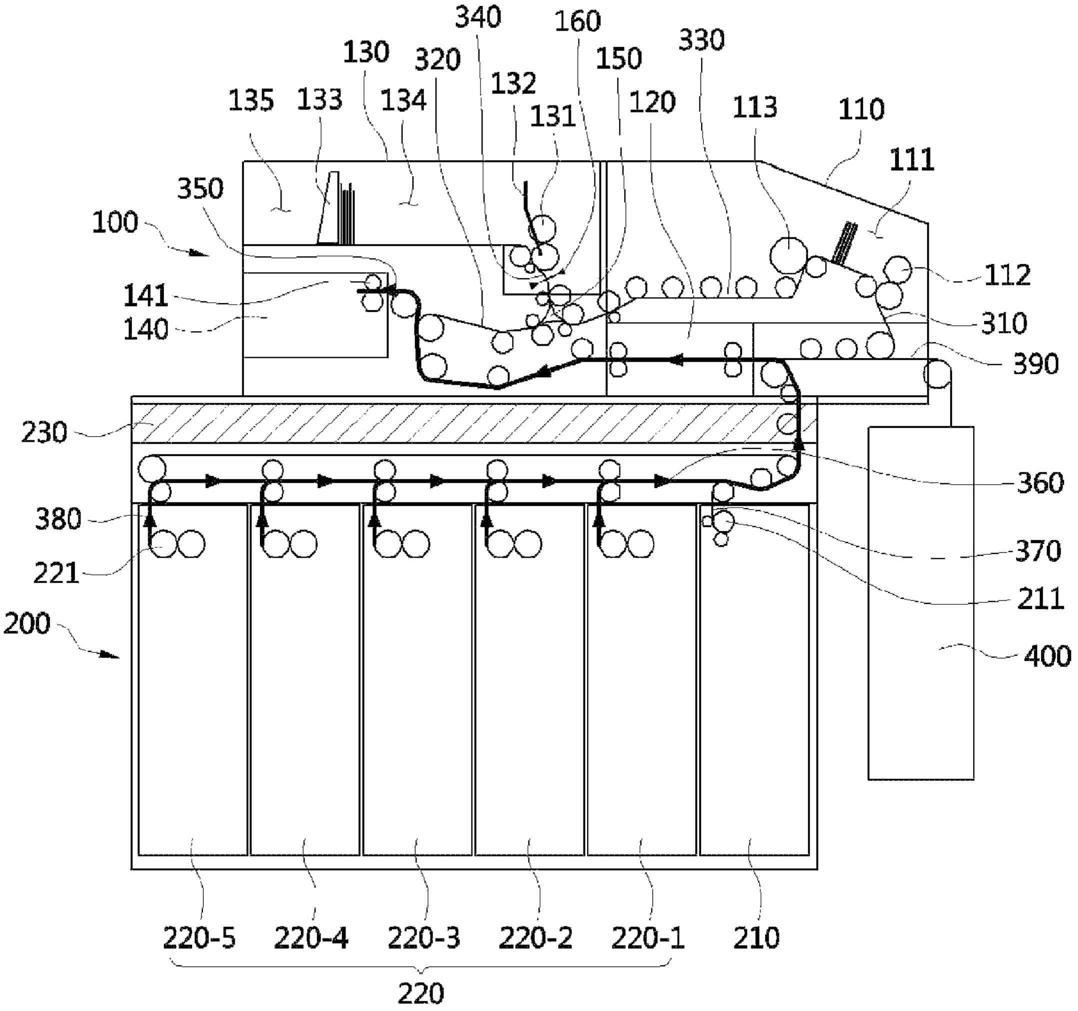

BILL PROCESSING DEVICE

BACKGROUND

1. Field of the Invention

The present disclosure relates to a banknote processing device, and more particularly, to a banknote processing device capable of separately processing normal banknotes and rejected banknotes when banknotes are replenished or collected.

2. Discussion of Related Art

In general, automatic teller machines are provided with banknote processing devices for automatically performing financial tasks such as deposit/withdrawal, replenishment/collection, and settlement of banknotes such as cash or checks.

A general banknote processing device according to the related art includes a deposit/withdrawal unit by which a customer inserts or receives a banknote for deposit/withdrawal, a determination unit that determines whether or not the banknote deposited or withdrawn through the deposit/withdrawal unit is normal, a temporary storage unit that temporarily stores the banknote determined as a normal banknote by the determination unit among the banknotes deposited through the deposit/withdrawal unit, a banknote storage unit that includes a plurality of cassettes for storing the deposited banknote and discharging the banknote stored therein when a withdrawal request is made, and a conveying path that conveys the banknote by interconnecting the deposit/withdrawal unit, the determination unit, the temporary storage unit, and the banknote storage unit.

Meanwhile, when the remaining amount of the banknotes to be withdrawn from the banknote storage unit is insufficient, the banknotes are replenished, and when a certain number or more of the banknotes are stored in the banknote storage unit, the banknotes are collected. However, the conventional banknote processing device has a problem in that, since a configuration for separately processing the normal banknotes and rejected banknotes when the banknotes are replenished or collected is insufficient, the normal banknotes and the rejected banknotes may not be managed separately.

As the related art related to the conventional banknote processing device, Korean Patent Application Publication No. 10-2017-0043190 discloses a banknote processing device capable of settlement processing on the banknotes inside the device, but has a problem in that, since a configuration for settlement of the replenished or collected banknotes is insufficient, the settlement of replenished or collected banknotes is inconvenient.

Further, since the temporary storage unit provided in the conventional banknote processing device has a small capacity for storing the banknotes, an operation of temporarily storing and separating the banknote in and from the temporary storage unit should be repeatedly performed when the banknotes are replenished or collected, and thus a lot of time is taken to replenish or collect the banknotes.

SUMMARY OF THE INVENTION

The present disclosure is directed to providing a banknote processing device that may separate and process normal banknotes and rejected banknotes during replenishment/collection and easily confirm statuses of replenished or collected banknotes.

The present disclosure is also directed to providing a banknote processing device capable of quickly performing a replenishment/collection operation by reducing the number of times the banknote is replenished or collected.

A banknote processing device includes: a determination unit that determines whether or not a replenished or collected banknote is normal; a temporary storage unit in which the banknote determined as a normal banknote by the determination unit is temporarily stored; a counterfeit banknote cassette in which a replenished rejected banknote and a collected rejected banknote rejected by the determination unit are stored; a banknote storage unit in which a replenished banknote or a banknote to be collected, which is determined as a normal banknote by the determination unit, is stored; a replenishment/collection cassette in which a banknote to be replenished in the banknote storage unit or a normal banknote collected from the banknote storage unit is stored; and a transport path through which the banknote is transported.

When the banknote is replenished, the replenished banknote separated from the replenishment/collection cassette may be transported to the determination unit, and the replenished banknote determined as a normal banknote by the determination unit may be temporarily stored in the temporary storage unit, then pass through the determination unit, and be transported to and stored in the banknote storage unit.

When the banknote is replenished, the replenished banknote separated from replenishment/collection cassette may be transported to the determination unit, and the replenished rejected banknote rejected by the determination unit may be transported to and stored in the counterfeit banknote cassette.

When the banknote is collected, the collected banknote separated from the banknote storage unit may be transported to the determination unit, and the collected banknote determined as a normal banknote by the determination unit may be temporarily stored in the temporary storage unit, then pass through the determination unit, and be transported to and stored in the replenishment/collection cassette.

When the banknote is collected, the collected banknote separated from the banknote storage unit may be transported to the determination unit, and the collected rejected banknote rejected by the determination unit may be transported to and stored in the counterfeit banknote cassette.

The banknote processing device may further include a sensor for counting the number of normal banknotes transported to the temporary storage unit.

The number of normal banknotes counted by the sensor may be displayed on a screen display unit of an automatic teller machine or confirmed by a receipt output from a receipt output unit.

The replenishment/collection cassette may be detachably connected to a connection transport path branched off from a transport path connected to an inlet side of the determination unit.

A capacity for storing the banknote in the temporary storage unit may be greater than or equal to a capacity for storing the banknote in the replenishment/collection cassette.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIG. 1 is a view illustrating a configuration of a banknote processing device according to the present disclosure;

FIGS. 2 and 3 are views illustrating a transport route of a normal banknote when the banknote processing device replenishes a banknote according to the present disclosure;

FIG. 4 is a view illustrating a transport route of a replenished rejected banknote when the banknote processing device replenishes the banknote according to the present disclosure;

FIGS. 5 and 6 are views illustrating a transport route of the normal banknote when the banknote processing device collects the banknote according to the present disclosure; and FIG. 7 is a view illustrating a transport route of a collected rejected banknote when the banknote processing device collects the banknote according to the present disclosure.

DETAILED DESCRIPTION OF EXEMPLARY EMBODIMENTS

Hereinafter, configurations and operations of exemplary embodiments of the present disclosure will be described in detail with reference to the accompanying drawings.

Referring to FIG. 1, a banknote processing device according to the present disclosure includes a deposit/withdrawal unit 110 that inputs and receives a banknote when the banknote is deposited or withdrawn, a determination unit 120 that determines whether the banknote to be replenished or collected is normal or abnormal, a temporary storage unit 130 in which the banknote determined as the normal banknote by the determination unit 120 is temporarily stored, a counterfeit banknote cassette 140 in which a replenished rejected banknote and a collected rejected banknote rejected by the determination unit 120 are stored, a banknote storage unit 220 including at least one reflux cassette 220-1, 220-2, 220-3, 220-4, and 220-5 in which the replenished banknote or the banknote to be collected, determined as a normal banknote by the determination unit 120, is stored, a replenishment/collection cassette 400 in which the banknote to be replenished in the banknote storage unit 220 or the normal banknote collected from the banknote storage unit 220 is stored, and transport paths 310-390 that transport the banknotes between the components.

Hereinafter, in the present specification, a "replenished banknote" refers to a banknote to be replenished from the replenishment/collection cassette 400 to the banknote storage unit 220, a "replenished rejected banknote" refers to a banknote determined as an abnormal banknote by the determination unit 120 among the banknotes transported from the replenishment/collection cassette 400 to replenish the banknotes, a "collected banknote" refers to a banknote to be collected from the banknote storage unit 220 to the replenishment/collection cassette 400, and a "collected rejected banknote" refers to a banknote determined as an abnormal banknote by the determination unit 120 among the banknotes transported from the banknote storage unit 220 to collect the banknotes.

The deposit/withdrawal unit 110 is a space in which, when the banknotes are deposited, the banknotes are input, and when the banknotes are withdrawn, the banknotes are loaded and received, and is provided with a separation mechanism 112 for separating the banknotes stored in an inner space 111 to a transport path 310 sheet by sheet and an accumulation mechanism 113 for accumulating the banknotes transported through a transport path 330 in the inner space 111. The inner space 111 may be divided into a plurality of spaces by one or more partitions. The separation mechanism 112 and the accumulation mechanism 113 each include a plurality of opposing rollers and are configured to separate or accumulate the banknotes by rotation of the rollers.

The determination unit 120, which determines the existence of abnormalities and the types of the banknotes transferred along the transport paths 310 and 320, includes a transport path formed therein, through which the banknotes are transported, and a driving mechanism driven so that the banknotes may be transported in opposite directions is provided in the transport path.

The determination unit 120 includes a detection unit such as a sensor for detecting whether or not the banknotes are skewed to one side with respect to the transport direction, an image sensor, and a two-sheet sensing unit, scans an image of the banknote while detecting the banknotes passing through the transport paths 310 and 320, and thus detects the authenticity, the type, and the damage of the transported banknote.

The determination unit 120 determines whether the banknote is the normal banknote or the abnormal banknote (hereinafter, referred to as a "rejected banknote"). The rejected banknote includes banknotes that may cause failure according to jamming and re-separation due to stack abnormalities when being stacked in the temporary storage unit 130, such as a skewed banknote inclined to one side, a long banknote transported while two sheets overlap each other, and a short gap banknote in which a gap between front and rear transported banknotes is smaller than a set gap.

The temporary storage unit 130 temporarily stores the banknotes determined as normal banknotes by the determination unit 120 when the banknotes are replenished or collected.

A separation and accumulation mechanism 131 is provided at an inlet side of the temporary storage unit 130, that is, at a position close to the deposit/withdrawal unit 110, so that the banknotes may be accumulated and separated. The separation and accumulation mechanism 131 may include a pickup roller for separating the banknotes accumulated in an inner space 134 sheet by sheet, a feed roller for applying a transport force to the banknotes separated by the pickup roller sheet by sheet, and a guide roller installed to face the feed roller to prevent separation of two banknotes.

In one embodiment, the temporary storage unit 130 is provided with a front plate 132 and a rear plate 133 so that the banknotes are stacked in the horizontal direction in a state in which the banknotes stand up in the inner space 134, and the rear plate 133 may move in a front-rear direction according to the number of banknotes accumulated in the inner space 134. An extra space 135 is formed behind the temporary storage unit 130, and thus when the size is expanded to the rear side in a direction opposite to a direction in which the deposit/withdrawal unit 110 is located, the capacity of the temporary storage unit 130 may be increased.

In particular, when the banknotes are replenished or collected using the temporary storage unit 130 as in the present disclosure, it is preferable that the capacity for storing banknotes in the temporary storage unit 130 is greater than or equal to the capacity for storing the banknotes in the replenishment/collection cassette 400.

In this way, in the present disclosure, by providing the large-capacity temporary storage unit 130 capable of expanding the size of the inner space 134 in which the banknotes are stored, since a plurality of banknotes may be temporarily stored in the temporary storage unit 130 at once when the banknotes are replenished or collected, the number of times by which the banknotes are replenished or collected can be reduced, and thus the banknotes can be quickly replenished or collected.

Further, a sensor 160 for counting the number of normal banknotes transported to the temporary storage unit 130 when the banknotes are replenished or collected is provided at the inlet side of the temporary storage unit 130. The number of normal banknotes counted by the sensor 160 may be displayed on a screen display unit of an automatic teller machine or confirmed by a receipt output from a receipt output unit. In this way, as the sensor 160 for counting the number of normal banknotes is provided on the inlet side of the temporary storage unit 130, the number of replenished or collected normal banknotes may be easily and accurately identified, and thus convenience of settlement of normal banknotes when the banknotes are replenished or collected can be improved.

The counterfeit banknote cassette 140 is used as a space for storing banknotes determined as counterfeit banknotes by the determination unit 120 when the banknotes are deposited and is used as a space for storing the replenished rejected banknote/collected rejected banknote determined as the rejected banknote by the determination unit 120 when the banknotes are replenished or collected. An integration mechanism 141 including a plurality of opposing rollers is provided on an inlet side of the counterfeit banknote cassette 140.

A rejected banknote storage unit 210, in which rejected banknotes determined as abnormal banknotes by the determination unit 120 when the banknotes are withdrawn are stored, is provided on one side of the banknote storage unit 220. A separation and accumulation mechanism 211 for separating and accumulating the banknotes is provided on the inlet side of the rejected banknote storage unit 210.

The banknote storage unit 220 is a space in which the banknotes to be withdrawn or the banknotes to be collected are stored, and a separation and accumulation mechanism 221 for separating and accumulating the banknotes is provided on inlet sides of the reflux cassettes 220-1, 220-2, 220-3, 220-4, and 220-5.

The same or different types of banknotes may be stored in the plurality of reflux cassettes 220-1, 220-2, 220-3, 220-4, and 220-5. When a plurality of different types of banknotes are handled, the plurality of different types of banknotes may be stored in one cassette or one type of banknotes may be stored in one cassette.

As a configuration for preventing theft of the banknotes, the rejected banknote storage unit 210 and the banknote storage unit 220 may be provided in a strong box 230.

Meanwhile, the deposit/withdrawal unit 110, the determination unit 120, the temporary storage unit 130, and the counterfeit banknote cassette 140 may be provided in an upper module 100, and the rejected banknote storage unit 210 and the banknote storage unit 220 may be provided in a lower module 200 stacked on a lower portion of the upper module 100.

Transport paths 310-390 for transporting the banknotes may include a first transport path 310 that connects the separation mechanism 112 of the deposit/withdrawal unit 110 and an inlet of the determination unit 120, a second transport path 320 that connects an outlet of the determination unit 120 and a gate 150, a third transport path 330 that connects the gate 150 and the accumulation mechanism 113 of the deposit/withdrawal unit 110, a fourth transport path 340 that connects the gate 150 and the separation and accumulation mechanism 131 of the temporary storage unit 130, a fifth transport path 350 that is branched off from the second transport path 320 and connected to the integration mechanism 141 of the counterfeit banknote cassette 140, a sixth transport path 360 that is branched off from the first transport path 310 located on the inlet side of the determination unit 120 and connects inlets of the plurality of reflux cassettes 220-1, 220-2, 220-3, 220-4, and 220-5 constituting the banknote storage unit 220, a seventh transport path 370 that is branched off from the sixth transport path 360 and connected to the separation and accumulation mechanism 211 of the rejected banknote storage unit 210, an eighth transport path 380 that is branched off from the sixth transport path 360 and connected to the separation and accumulation mechanism 221 of the plurality of reflux cassettes 220-1, 220-2, 220-3, 220-4, and 220-5, and a connection transport path 390 that is branched off from the first transport path 310 and connected to the replenishment/collection cassette 400.

The gate 150 is provided at a point at which the second transport path 320, the third transport path 330, and the fourth transport path 340 intersect each other, and serves to switch a transport direction of the banknotes.

The replenishment/collection cassette 400 is a space in which the banknotes to be replenished in the banknote storage unit 220 or the normal banknotes collected from the banknote storage unit 220 are stored, and may be detachably connected to the connection transport path 390 branched off from the first transport path 310 connecting the deposit/withdrawal unit 110 and the determination unit 120.

Referring to FIGS. 2 and 3, a process of processing normal banknotes when the banknotes are replenished in the banknote processing device according to the present disclosure will be described.

Referring to FIG. 2, when the banknotes are replenished, the replenished banknotes separated from the replenishment/collection cassette 400 are transported to the determination unit 120 through the connection transport path 390 and the first transport path 310, and the banknotes determined as normal banknotes by the determination unit 120 are temporarily stored in the temporary storage unit 130 through the second transport path 320 and the fourth transport path 340. In this case, the direction of the gate 150 is switched so that the second transport path 320 and the fourth transport path 340 are connected, and the sensor 160 counts the number of normal replenished banknotes transported to the temporary storage unit 130.

Referring to FIG. 3, the normal replenished banknotes temporarily stored in the temporary storage unit 130 sequentially pass through the fourth transport path 340, the second transport path 320, the determination unit 120, the first transport path 310, the sixth transport path 360, and the eighth transport path 380 and are then transported to and stored in the banknote storage unit 220.

Referring to FIG. 4, a process of processing replenished rejected banknotes when the banknotes are replenished in the banknote processing device according to the present disclosure will be described.

When the banknotes are replenished, the replenished banknotes separated from the replenishment/collection cassette 400 are transported to the determination unit 120 through the connection transport path 390 and the first transport path 310, and the replenished rejected banknotes determined as abnormal banknotes by the determination unit 120 are transported to and stored in the counterfeit banknote cassette 140 through the second transport path 320 and the fifth transport path 350. The replenished rejected banknotes stored in the counterfeit banknote cassette 140 are processed by replacing or collecting the counterfeit banknote cassette 140 by a staff member or service person.

Referring to FIGS. 5 and 6, a process of processing normal banknotes when the banknotes are collected in the banknote processing device according to the present disclosure will be described.

Referring to FIG. 5, when the banknotes are collected, the collected banknotes separated from the banknote storage unit 220 are transported to the determination unit 120 through the eighth transport path 380, the sixth transport path 360, and the first transport path 310, and the banknotes determined as normal banknotes by the determination unit 120 are temporarily stored in the temporary storage unit 130 through the second transport path 320 and the fourth transport path 340. In this case, the direction of the gate 150 is switched so that the second transport path 320 and the fourth transport path 340 are connected, and the sensor 160 counts the number of normal collected banknotes transported to the temporary storage unit 130.

Referring to FIG. 6, the normal collected banknotes temporarily stored in the temporary storage unit 130 sequentially pass through the fourth transport path 340, the second transport path 320, the determination unit 120, the first transport path 310, and the connection transport path 390 and are then transported to and stored in the replenishment/collection cassette 400.

Referring to FIG. 7, a process of processing collected rejected banknotes when the banknotes are collected in the banknote processing device according to the present disclosure will be described.

When the banknotes are collected, the collected banknotes separated from the banknote storage unit 220 are transported to the determination unit 120 through the eighth transport path 380, the sixth transport path 360, and the first transport path 310, and the collected rejected banknotes determined as abnormal banknotes by the determination unit 120 are transported to and stored in the counterfeit banknote cassette 140 through the second transport path 320 and the fifth transport path 350. The collected rejected banknotes stored in the counterfeit banknote cassette 140 are processed by replacing or collecting the counterfeit banknote cassette 140 by a staff member or service person.

As described above, according to the present disclosure, the normal banknotes and the rejected banknotes may be separately processed when the banknotes are replenished or collected, the sensor 160 for counting the number of normal banknotes transported to the temporary storage unit 130 when the banknotes are replenished or collected is provided, the number of counted normal banknotes is displayed on the screen display unit of the automatic teller machine or confirmed by the receipt output from the receipt output unit, and thus convenience of settlement of the number of normal banknotes when the banknotes are replenished or collected can be improved.

Further, by providing the sensor 160, when the staff member or service person replenishes the banknotes, there is no need to know a status of the banknotes stored in the replenishment/collection cassette 400 in advance, and when the banknotes are collected, the test material of the collected banknotes may be identified even before the replenishment/collection cassette 400 is sent to the center.

Further, when the banknotes are replenished or collected, the rejected banknotes are separately stored in the counterfeit banknote cassette 140, and after the replenishment/collection operation is terminated, the staff member or service person collects the counterfeit banknote cassette 140 together with the replenishment/collection cassette 400, and thus management of replenished or collected rejected banknotes become easier.

Further, according to the present disclosure, by applying a large-capacity temporary storage unit 130, when the banknotes are replenished or collected, a plurality of banknotes may be temporarily stored in the temporary storage unit 130 at once, and thus the banknotes can be quickly replenished or collected.

According to a banknote processing device according to the present disclosure, when a banknote is replenished, a normal banknote is transported to a banknote storage unit via a temporary storage unit, when the banknote is collected, the normal banknote is transported to a replenishment/collection cassette via the temporary storage unit, when the banknote is replenished or collected, a rejected banknote is transported to a counterfeit banknote cassette, and a staff member or service person may replace or collect the counterfeit banknote cassette. Thus, when the banknote is replenished or collected, the normal banknote and the rejected banknote can be separated and processed, and thus the normal banknote and the rejected banknote can be managed separately.

Further, a sensor for counting the number of normal banknotes transported to the temporary storage unit when the banknote is replenished or collected is provided, the number of counted normal banknotes is displayed on a screen display unit of an automatic teller machine or confirmed by a receipt output from a receipt output unit, and thus convenience of settlement of the number of normal banknotes when the banknote is replenished or collected can be improved.

Further, by providing the sensor, when the staff member or service person replenishes the banknotes, there is no need to know a test material of the banknotes stored in the replenishment/collection cassette in advance, and when the banknotes are collected, the test material of the collected banknotes may be confirmed even before the replenishment/collection cassette is sent to the center.

Further, when the banknote is replenished or collected, the rejected banknotes are separately stored in the counterfeit banknote cassette, and after the replenishment/collection operation is terminated, the staff member or service person collects the counterfeit banknote cassette together with the replenishment/collection cassette, and thus management of replenished or collected rejected banknotes becomes easier.

Further, by applying a large-capacity temporary storage unit so that the capacity for storing the banknote in the temporary storage unit is greater than the capacity for storing the banknote in the replenishment/collection cassette, since a plurality of banknotes may be temporarily stored in the temporary storage unit at once when the banknote is replenished or collected, the number of times the banknotes are replenished or collected can be reduced, and thus the banknotes can be quickly replenished or collected.

As described above, the present disclosure is not limited to the above-described embodiments, obvious modifications can be made by those skilled in the art to which the present disclosure pertains without departing from the technical spirit of the present disclosure claimed by the appended claims, and the obvious modifications belong to the scope of the present disclosure.

What is claimed is:

1. A banknote processing device comprising:

a determination unit that determines whether or not a replenished or collected banknote is normal;

a temporary storage unit in which the banknote determined as a normal banknote by the determination unit is temporarily stored;

a counterfeit banknote cassette in which a replenished rejected banknote and a collected rejected banknote rejected by the determination unit are stored;

a banknote storage unit in which a replenished banknote or a banknote to be collected, which is determined as a normal banknote by the determination unit, is stored;

a rejected banknote storage unit in which rejected banknotes determined as abnormal banknotes by the determination unit when the banknotes are withdrawn are stored, is provided on one side of the banknote storage unit;

a replenishment/collection cassette in which a banknote to be replenished in the banknote storage unit or a normal banknote collected from the banknote storage unit is stored; and a transport path through which the banknote is transported, wherein:

the determination unit, the temporary storage unit, and the counterfeit banknote cassette are provided in an upper module, and the rejected banknote storage unit and the banknote storage unit are provided in a strong box of a lower module stacked on a lower portion of the upper module, when the banknote is replenished, the replenished banknote separated from replenishment/collection cassette is transported to the determination unit, and the replenished rejected banknote rejected by the determination unit is transported to and stored in the counterfeit banknote cassette.

2. The banknote processing device of claim 1, wherein when the banknote is replenished, the replenished banknote separated from the replenishment/collection cassette is transported to the determination unit, and the replenished banknote determined as a normal banknote by the determination unit is temporarily stored in the temporary storage unit, then passes through the determination unit, and is transported to and stored in the banknote storage unit.

3. The banknote processing device of claim 1, wherein when the banknote is collected, the collected banknote separated from the banknote storage unit is transported to the determination unit, and the collected banknote determined as a normal banknote by the determination unit is temporarily stored in the temporary storage unit, then passes through the determination unit, and is transported to and stored in the replenishment/collection cassette.

4. The banknote processing device of claim 1, wherein when the banknote is collected, the collected banknote separated from the banknote storage unit is transported to the determination unit, and the collected rejected banknote rejected by the determination unit is transported to and stored in the counterfeit banknote cassette.

5. The banknote processing device of claim 1, further comprising a sensor for counting the number of normal banknotes transported to the temporary storage unit.

6. The banknote processing device of claim 5, wherein the number of normal banknotes counted by the sensor is displayed on a screen display unit of an automatic teller machine or confirmed by a receipt output from a receipt output unit.

7. The banknote processing device of claim 1, wherein the replenishment/collection cassette is detachably connected to a connection transport path branched off from a transport path connected to an inlet side of the determination unit.

8. The banknote processing device of claim 1, wherein a capacity for storing the banknote in the temporary storage unit is greater than or equal to a capacity for storing the banknote in the replenishment/collection cassette.

* * * * *